No. 742,263. PATENTED OCT. 27, 1903.
W. M. WADLEIGH.
HARVESTER ATTACHMENT FOR SAVING AND SECURING DOWN GRAIN.
APPLICATION FILED JUNE 15, 1903.
NO MODEL.
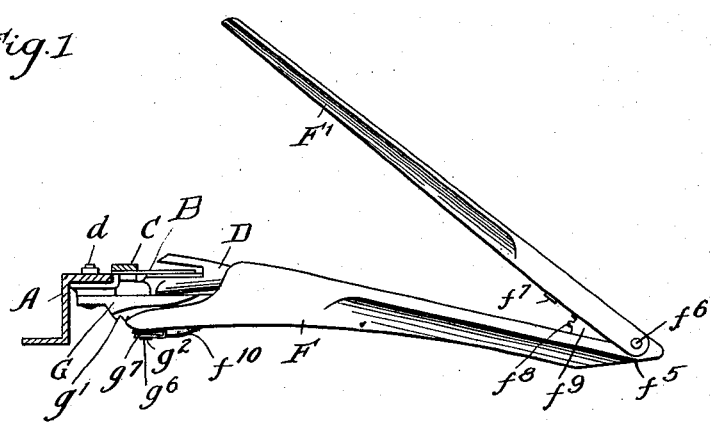
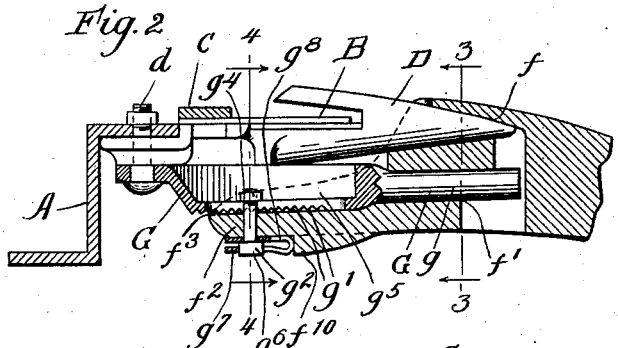
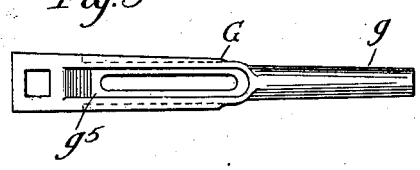
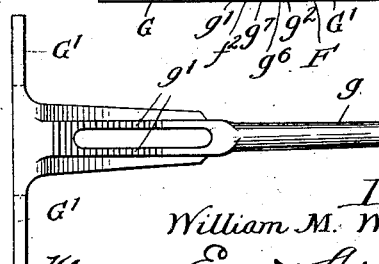
Witnesses:
Wm. Geiger
H. M. Munday
Inventor:
William M. Wadleigh
By Munday, Evarts & Adcock,
Attorneys
THE NORRIS PETERS CO., PHOTO-LITHO., WASHINGTON, D. C.

No. 742,263.  
Patented October 27, 1903.

UNITED STATES PATENT OFFICE.

WILLIAM M. WADLEIGH, OF CHICAGO, ILLINOIS.

HARVESTER ATTACHMENT FOR SAVING AND SECURING DOWN GRAIN.

SPECIFICATION forming part of Letters Patent No. 742,263, dated October 27, 1903.

Application filed June 15, 1903. Serial No. 161,431. (No model.)

*To all whom it may concern:*

Be it known that I, WILLIAM M. WADLEIGH, a citizen of the United States, residing in Chicago, in the county of Cook and State of Illinois, have invented a new and useful Improvement in Harvester Attachments for Saving and Securing Down Grain, of which the following is a specification.

My invention relates to harvesters, reapers, and other machines for cutting grains, seed, grasses, and other crops, and more particularly to attachments thereto for raising and saving down grain.

My present invention is an improvement upon the grain-raising attachments for harvesters heretofore patented to me in Letters Patent Nos. 607,099 and 607,100, both of July 12, 1898, and upon that shown and described in my now pending and allowed application, Serial No. 119,220, filed August 11, 1902; and the object of my present improvement is to facilitate the attachment of my elevating-guard to the finger-guards of different harvesting-machines, the finger-guards varying more or less in length, size, and shape on different machines, while at the same time rigidly and firmly securing the elevating-guard in place.

My invention consists in the means I employ to practically accomplish this object or result—that is to say, it comprises, in combination with a finger-guard and finger-bar, an elevating-guard having an elevating-arm and a lower or supporting arm provided with an upper socket to receive and bear against the finger-guard and a lower socket to receive a coupling-piece and a coupling-piece secured to the finger-bar below the finger-guard and adjustably connected to said supporting-arm of the elevating-guard, whereby said elevating-guard receives bracing and support both from the finger-guard and from the coupling-piece. The supporting-arm of the elevating-guard is adjustably connected to the coupling-piece by a connecting-bolt and interengaging notches and serrations with which said coupling-piece and said supporting-arm of the elevating-guard are provided. By this means whatever the length or shape of the finger-guard may be the supporting-arm of the elevating-guard may be forced into snug engagement with the finger-guard, so that the elevating-guard will receive direct and bracing support from the finger-guard itself, and there being clamped by the connecting-bolt to the notched or serrated coupling-piece, which is also rigidly secured to the sickle-bar, the supporting-arm of the elevating-guard will thus have a double support and connection with the finger-bar, one connection being through the finger-guard itself and the other through the coupling-piece, thereby giving great strength and firmness to the elevating-guard as a whole and enabling it to properly and successfully withstand the strains to which it is subjected in use by reason of its comparatively great length in advance of the sickle-bar and the tangled grain and obstructions which it encounters in elevating down grain. At the same time my improvement enables the elevating-guards to be very quickly applied to different machines and removed therefrom.

My invention also consists in the novel construction of parts and devices and in the novel combinations of parts and devices herein shown or described, as hereinafter set forth in the claims.

In the accompanying drawings, which form a part of this specification, Figure 1 is a side elevation of an elevating-guard embodying my invention, showing the finger-bar in cross-section. Fig. 2 is a central vertical section. Figs. 3 and 4 are cross-sections on lines 3 3 and 4 4, respectively, of Fig. 2. Fig. 5 is a detail plan view of the coupling-piece. Fig. 6 is a view similar to Fig. 2, illustrating the application of my invention to a different form of finger-bar. Fig. 7 is a section on line 7 7 of Fig. 6, and Fig. 8 shows a modified form of the coupling-piece intended for use with finger-bars of the forms shown in Figs. 6 and 7, and Fig. 9 is a detail bottom perspective view showing the slot in the nut-lock engaging the head of the connecting-bolt.

In said drawings, A represents the finger-bar of an ordinary harvester or other machine; B, the sickle; C, the sickle-bar; D, the ordinary finger-guards within which the sickle reciprocates, and F F' are the elevating-guards, the same being preferably attached to each alternate finger-guard on the finger-bar, though a greater or less number may be used. Each of the elevating-guards comprises a lower or supporting arm F and a pivotal and adjustable elevating-arm F'. The lower or supporting arm F is provided with two sockets $f\ f'$, one above the other, through and by which it is connected to and rigidly supported from the finger-bar by means of the finger-guard D and an adjustable coupling-piece G. The upper socket $f$ is tapering and fits and receives the tapering end or point of the finger-guard and has a snug close fit and bearing against the finger-guard whatever may be the length or shape of the finger-guard. The lower socket $f'$ in the supporting-arm F is preferably round or cylindrical and snugly fits the round or cylindrical end $g$ of the coupling-piece G, the supporting-arm telescoping or being adjustable on the coupling-piece according to the length of the finger-guard, so that the upper socket of the supporting-arm will have a snug fit and bearing against the finger-guard, and thus cause it to receive direct and bracing support from the finger-guard itself. To provide for this adjustment of the supporting-arm on the coupling-piece, the lower projecting lip $f^2$ of the supporting-arm is provided with a notch or transverse rib $f^3$, which fits in one of the notches or serrations $g'$ on the lower side of the coupling-piece, and the supporting-arm and elevating-guard are securely clamped to the adjustable coupling-piece G by a connecting-bolt $g^2$, the nut $g^4$ of which fits in the channel $g^5$ of the coupling-piece and the bolt-head $g^6$ of which is preferably provided with a nut-lock $g^7$, consisting of a washer having a looped portion $g^8$, adapted to be looped or bent over the head of the bolt after it is screwed home, and provided with a slot $g^9$ to embrace the head of the bolt and which nut-lock when looped or bent over the bolt-head engages a projection or shoulder $f^{10}$ on the supporting-arm F to prevent the bolt from turning. The coupling-piece G is or may be secured to the finger-bar by the same bolt $d$ by which the finger-guard itself is secured thereto.

The lower or supporting arm F of the elevating-guard projects forwardly and downwardly from the finger-guard and is provided at its front end with an incline or taper $f^5$, giving the extreme front end of the supporting-arm a slant or runner shape to prevent the elevating-guard from penetrating or projecting into the ground, while permitting it to ride directly on the ground and under the down grain or crop which it is desired to cut and save. The upper or elevating arm F' of the elevating-guard is pivotally connected at its front end with the front end or nose of the lower or supporting arm F by a pivot $f^6$, and it is adjusted at any desired angle or elevation by means of a sliding spring lock-bolt $f^7$, reciprocating in the elevating-arm F' and which engages notches or recesses $f^8$ in the upright web $f^9$ of the lower or supporting arm F.

In the modification illustrated in Figs. 6, 7, and 8, which is adapted to be secured to finger-bars having upright flanges or webs $a$, to which the finger-guards are bolted by a pair of bolts, the distance between which may vary in different machines, I provide the coupling-piece with right-angle flanges G' G', having slots $G^2$ to receive the connecting-bolts $d$, so that the coupling-piece may be readily applied whatever the distance between the bolts $d\ d$.

In the form illustrated in Figs. 1 to 5 the finger-guard is ordinarily secured to the finger-bar by a single bolt, while in the form illustrated in Figs. 6 to 8 a pair of bolts $d\ d$ are ordinarily employed for each finger-guard.

I claim—

1. In a harvester or like machine, the combination with a finger-guard and finger-bar, of an elevating-guard having an elevating-arm and a lower or supporting arm provided with an upper socket to receive and bear against the finger-guard, and a lower socket to receive a coupling-piece, and a coupling-piece secured to the finger-bar below the finger-guard and adjustably connected to said supporting-arm of the elevating-guard, whereby said elevating-guard receives bracing and support both from the finger-guard and from the coupling-piece, substantially as specified.

2. In a harvester or like machine, the combination with a finger-guard and finger-bar, of an elevating-guard having an elevating-arm and a lower or supporting arm provided with an upper socket to receive and bear against the finger-guard and a lower socket to receive a coupling-piece, and a coupling-piece secured to the finger-bar below the finger-guard and adjustably connected to said supporting-arm of the elevating-guard, whereby said elevating-guard receives bracing and support both from the finger-guard and from the coupling-piece, said coupling-piece and supporting-arm having an interengaging rib and notches, substantially as specified.

3. In a harvester or like machine, the combination with a finger-guard and finger-bar, of an elevating-guard having an elevating-arm and a lower or supporting arm provided with an upper socket to receive and bear against the finger-guard, and a lower socket to receive a coupling-piece, and a coupling-piece secured to the finger-bar below the finger-guard and adjustably connected to said supporting-arm of the elevating-guard, whereby said elevating-guard receives bracing and support both from the finger-guard and from the coupling-piece, said coupling-piece and supporting-arm having an interengaging rib and notches, and a connecting-bolt extending through the coupling-piece and the supporting-arm of the elevating-guard, substantially as specified.

4. The combination with a finger-guard and finger-bar, of an elevating-guard having an elevating-arm and a lower or supporting arm provided with a socket to receive the finger-guard, and a coupling-piece below the finger-guard secured to the finger-bar and having an adjustable or telescopic connection with said supporting-arm of the elevating-guard, substantially as specified.

5. The combination with a finger-guard and finger-bar, of an elevating-guard having a lower or supporting arm furnished with a socket to fit and receive the finger-guard, and having an elevating-arm pivotally connected to said supporting-arm at the front end thereof and provided with a lock-bolt engaging a notched rib with which the supporting-arm is provided, and a coupling-piece secured to the finger-bar and provided with notches for adjusting the supporting-arm of the elevating-guard thereon, and a bolt connecting said coupling-piece and supporting-arm, substantially as specified.

6. The combination with a finger-guard and finger-bar, of an elevating-guard having a lower or supporting arm furnished with a socket to fit and receive the finger-guard, and having an elevating-arm pivotally connected to said supporting-arm at the front end thereof and provided with a lock-bolt engaging a notched rib with which the supporting-arm is provided, and a coupling-piece secured to the finger-bar and provided with notches for adjusting the supporting-arm of the finger-guard thereon, and a bolt connecting said coupling-piece and supporting-arm, said coupling-piece having a channel to receive the nut of said connecting-bolt and prevent the same from turning, and a nut-lock engaging a projection on said supporting-arm to prevent the bolt from turning, substantially as specified.

7. The combination with a finger-guard, of a finger-bar, an elevating-guard having a supporting-arm provided with a socket to receive the finger-guard, and a coupling-piece secured to the finger-bar under the finger-guard and adjustably connected to said supporting-arm, said coupling-piece having a channel to receive the nut of a connecting-bolt, a connecting-bolt extending through said coupling-piece and supporting-arm, and having a head, and a nut-lock, said supporting-arm having a shoulder or projection engaging said nut-lock, substantially as specified.

8. The combination with a finger-guard, of a finger-bar, of an elevating-guard having a supporting-arm provided with a socket to receive the finger-guard, and a coupling-piece secured to the finger-bar under the finger-guard, said coupling-piece having a channel to receive the nut of a connecting-bolt, a connecting-bolt extending through said coupling-piece and supporting-arm, and having a head, and a nut-lock, said supporting-arm having a shoulder or projection engaging said nut-lock, said nut-lock having a looped or bent portion furnished with a slot or opening to receive the bolt-head, substantially as specified.

WILLIAM M. WADLEIGH.

Witnesses:
H. W. MUNDAY,
WILLIAM A. GEIGER.